(12) United States Patent
Colburn et al.

(10) Patent No.: US 11,345,005 B2
(45) Date of Patent: May 31, 2022

(54) SPLIT NUT VALVE SEAT PULLER

(71) Applicants: William Colburn, Katy, TX (US);
Ricardo Betancourt, Katy, TX (US);
Robert H Ash, Jr., Magnolia, TX (US)

(72) Inventors: William Colburn, Katy, TX (US);
Ricardo Betancourt, Katy, TX (US);
Robert H Ash, Jr., Magnolia, TX (US)

( * ) Notice: Subject to any disclaimer, the term of this patent is extended or adjusted under 35 U.S.C. 154(b) by 214 days.

(21) Appl. No.: 16/245,434

(22) Filed: Jan. 11, 2019

(65) Prior Publication Data
US 2020/0223043 A1    Jul. 16, 2020

(51) Int. Cl.
*B25B 27/26* (2006.01)
*B25B 27/06* (2006.01)
*E21B 34/02* (2006.01)
*F16K 51/00* (2006.01)

(52) U.S. Cl.
CPC ............ *B25B 27/26* (2013.01); *B25B 27/064* (2013.01); *E21B 34/02* (2013.01); *F16K 51/00* (2013.01)

(58) Field of Classification Search
CPC ... B25B 27/21; B25B 27/0028; B25B 27/023; B25B 27/06; B25B 27/062; Y10T 29/53552; Y10T 29/53557; Y10T 29/53596; Y10T 29/53657; Y10T 29/53848; Y10T 29/53857; Y10T 137/0486; Y10T 137/6109; Y10T 137/6254; Y10T 137/0491
See application file for complete search history.

(56) References Cited

U.S. PATENT DOCUMENTS

| | | | | |
|---|---|---|---|---|
| 3,358,341 A | * | 12/1967 | Burstall | E21B 19/07 294/102.2 |
| 3,748,702 A | * | 7/1973 | Brown | E21B 19/10 188/67 |
| 6,227,225 B1 | * | 5/2001 | Domingue | F16K 43/00 137/15.17 |
| 6,712,574 B1 | * | 3/2004 | Roopnarine | F16B 37/0857 411/267 |
| 6,854,932 B2 | * | 2/2005 | Putnam | F16L 55/1658 254/107 |

(Continued)

*Primary Examiner* — Tyrone V Hall, Jr.
*Assistant Examiner* — Makena S Markman
(74) *Attorney, Agent, or Firm* — James Robert (Jim) Johnson

(57) ABSTRACT

The invention is an improved tool for pulling a valve seat from a valve in a fluid end. The invention replaces the standard threaded nut and stem commonly used in such tools with a split nut comprising a plurality of removeably engageable split nut segments placed within a base and a stem configured to be used with the plurality of removeably engageable split nut segments. In the preferred embodiment, each split nut segment possesses a center-facing surface relative to the longitudinal axis of the invention comprising a set of horizontal v-grooves suitable to be disposed against complementary v-grooves of the stem. The base permits the plurality of split nut segments to be placed in an engaged position permitting the v-grooves of the split nut segments to removeably engage the v-grooves of the stem securely or to be placed in a disengaged position. The base containing the split nut segments is durable enough to be used in oil field work but lightweight enough to be used by individual or groups of workers safely.

1 Claim, 8 Drawing Sheets

(56) References Cited

U.S. PATENT DOCUMENTS

| | | | | |
|---|---|---|---|---|
| 7,267,168 | B1* | 9/2007 | Sipos | E21B 19/10 166/75.14 |
| 7,686,088 | B2* | 3/2010 | Shahin | E21B 19/10 166/382 |
| 7,762,343 | B2* | 7/2010 | Sonneveld | E21B 19/07 166/382 |
| 7,891,469 | B1* | 2/2011 | Sipos | E21B 19/10 188/67 |
| 8,266,781 | B2* | 9/2012 | Bucknell | B25B 29/02 29/452 |
| 8,316,929 | B2* | 11/2012 | Angelle | E21B 17/012 166/77.1 |
| 10,161,201 | B2* | 12/2018 | Wentworth | E21B 19/10 |

* cited by examiner

SPLIT NUT VALVE SEAT PULLER

BACKGROUND OF THE INVENTION

Brief Description of Prior Art

It is commonly known in oil field work that fluid ends and the parts which comprise them are subjected to high levels of wear. Valve seats, for example, require frequent replacement because of the amount of wear to which they are subjected. Generally, valve seats are difficult to remove and replace. They require specialized tools and a considerable amount of labor. One tool commonly used to pull valve seats is a stem, onto which is fitted a duck bill and which is inserted into a valve of a fluid end. A stem nut is then screwed by hand onto the valve seat stem. This takes time. The tool is heavy, and the number of steps to place the tool into position and use it creates multiple opportunities for mistakes and worker injuries. In the common form of the tool, the tool must be raised over the heads of workers in order to be placed into position. Given the size and weight of the tool, this exposes workers to a risk of serious injury.

As the stem nut is screwed into place, the valve seat stem is raised against the fluid end, which in turn raises the duck bill into position against the valve seat. The stem nut is screwed into position and tightened against a pancake jack or some other suitable lifting device placed atop the fluid end. Once the stem nut is tightly in place, the pancake jack is used to raise the valve seat stem, including the stem nut and duck bill, thereby pulling the valve seat from the valve.

Despite the insufficiencies of tools currently used to pull valve seats, most efforts to improve tools for pulling valve seats relate to modifications to duck bills. Little attention has been paid to improving the placement of the stem nut on the valve seat stem and tightening or securing it in place quickly and safely.

There is a need for an improved valve seat stem which quickly and safely permits the placement of a stem nut in place on a valve seat stem so as to place a duck bill in position to pull a valve seat (which may be referred to as a "seat"). The present invention meets that need.

SUMMARY OF THE INVENTION

The invention modifies and improves the standard threaded nut and complementarily threaded seat puller stem commonly used in the industry to engage and remove a valve seat. Instead of a single conventional stem nut which is screwed onto a conventional seat puller stem threaded with a known helical thread, the invention uses a split nut in which a nut are cut into a plurality of segments. The plurality of split nut segments engage the seat puller stem through the use of horizontal v-grooves, with one set of v-grooves disposed on one surface of each split nut segment and a mated set of horizontal v-grooves disposed on the seat puller stem in place of the standard helical thread.

The split nut segments are placed in a suitable base in a manner which allows all of the split nut segments to move and to be moved inwardly (toward the center longitudinal axis of the invention) so as to allow the v-grooves of the split nut segments to engage the v-grooves of the seat puller stem. Once the v-grooves of the plurality of split nut segments are engaged against the v-grooves of the seat puller stem and with the duckbill in place against the valve seat, the pancake jack is used to raise the invention and the seat puller stem, which pulls the valve seat from the fluid end.

The invention has a top covering the base in which the split nut segments are placed. The base has a conical interior surface designed to allow the split nut segments and the v-grooves thereon to slide downward and inward to engage the v-grooves of the seat puller stem. The conical interior surface of the base improves functionality by using gravity to aid this motion. The split nut segments resist sliding down to the bottom of the conical interior by the use of helical springs placed in holes between each of the split nut segments to separate each split nut segment. A wave spring placed atop the base between the base and the top of the invention raises the top off the base and creates sufficient space in the interior of the invention when not in use to allow the split nut segments to remain in an upward and outward position on the conical surface of the interior of the base. This permits installation of the invention with respect to the seat puller stem by separating the split nut segments enough to allow the seat puller stem to pass through a hole at the center of the invention. To use the invention, first a pancake jack is placed atop a fluid end. To engage the v-grooves of the split nut segments against the v-grooves of the seat puller stem, a seat puller stem is manually placed downward through the fluid end cylinder until the duckbill clears through the seat to be removed. The worker then places the invention over the seat puller stem, allowing the seat puller stem to pass through a central hole in the invention until the invention rests on the pancake jack atop a fluid end. The worker then lifts the seat puller stem upward to engage the duckbill against the valve seat and presses down on the top of the invention, thus compressing the wave spring. By pressing down the top of the invention, the split nut segments are also pushed down the conical interior surface of the base and inward toward the longitudinal axis of the invention, simultaneously compressing the helical springs between the split nut segments, until the v-grooves of the split nut segments engage the v-grooves of the seat puller stem.

The v-grooves of the seat puller stem are held in place against the v-grooves of each segment of the split nut segments through the combination of friction, gravity and axial load. The pancake jack is then used to lift the invention, causing the seat puller stem to rise and in turn pull the valve seat from the fluid end. Once the valve seat is removed, the pancake jack is lowered. A worker lifts the seat puller stem slightly, allowing the helical springs placed between each of the split nut segments push to separate the split nut segments and in so doing push the split nut segments up the conical interior surface of the invention. This disengages the v-grooves of the seat puller stem from those of the split nut segments, allowing the seat puller stem to be removed from the fluid end.

DETAILED DESCRIPTION OF THE INVENTION

Figure 3:
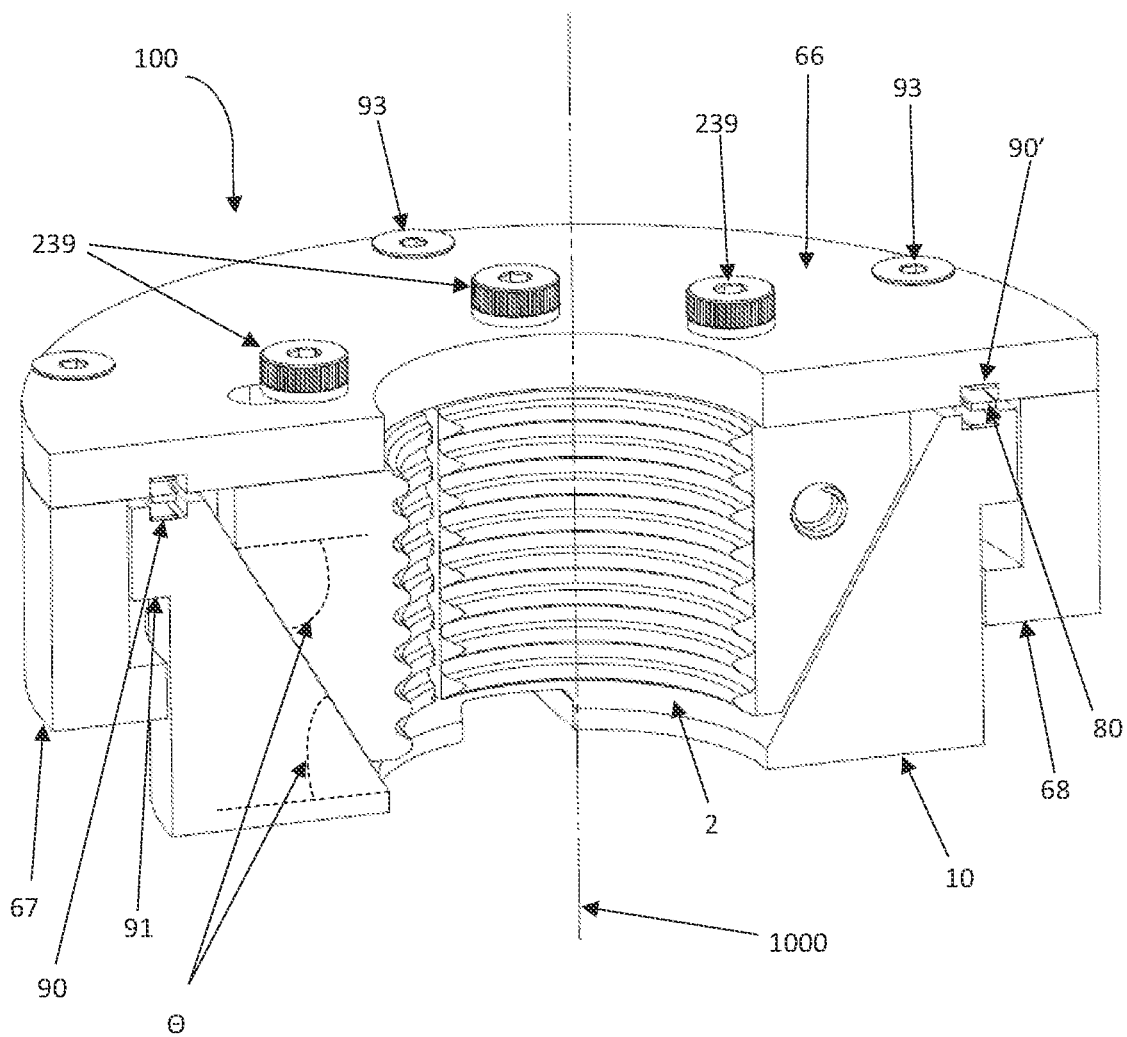
FIG. 3 depicts a cutaway orthogonal view of the invention showing split nut segments in place on the base of the invention as well as the top and other elements of the invention.

To aid understanding of the invention, the following conventions are provided. The invention consists of two primary inventive pieces which operate jointly—the assembled split nut segments, springs, base and top as one inventive part and the v-grooves of the seat puller stem as the other. Further, the assembled split nut segments, springs, base and top, depicted in cutaway view in FIG. 3 are generally in the form of a hollow ring having a diameter, height and (imaginary) longitudinal axis 1000.

Figure 1:
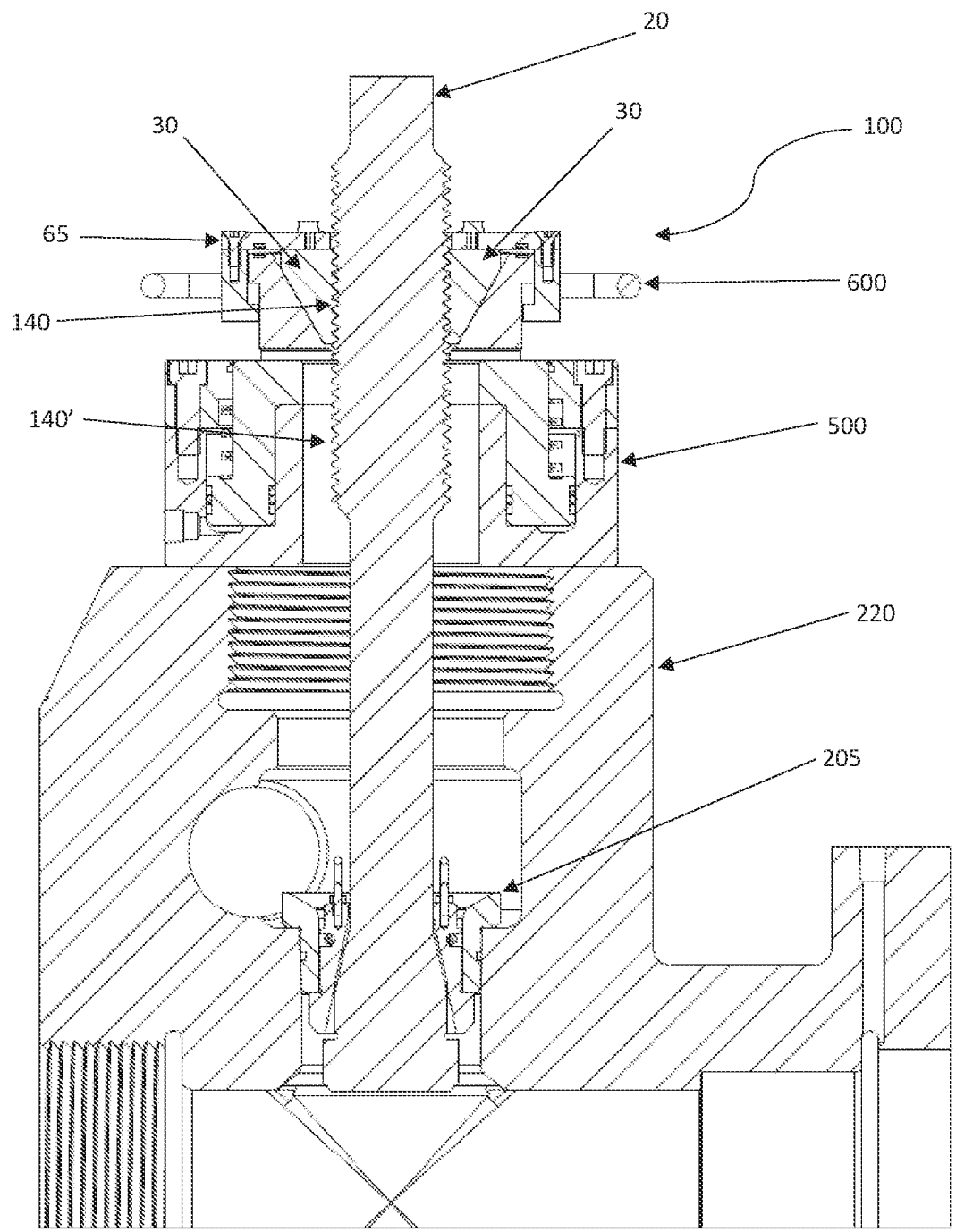
FIG. 1 depicts a cutaway view of the invention in position atop a pancake jack atop a fluid end valve seat in which a seat puller stem with a duckbill is in place.
Figure 2:
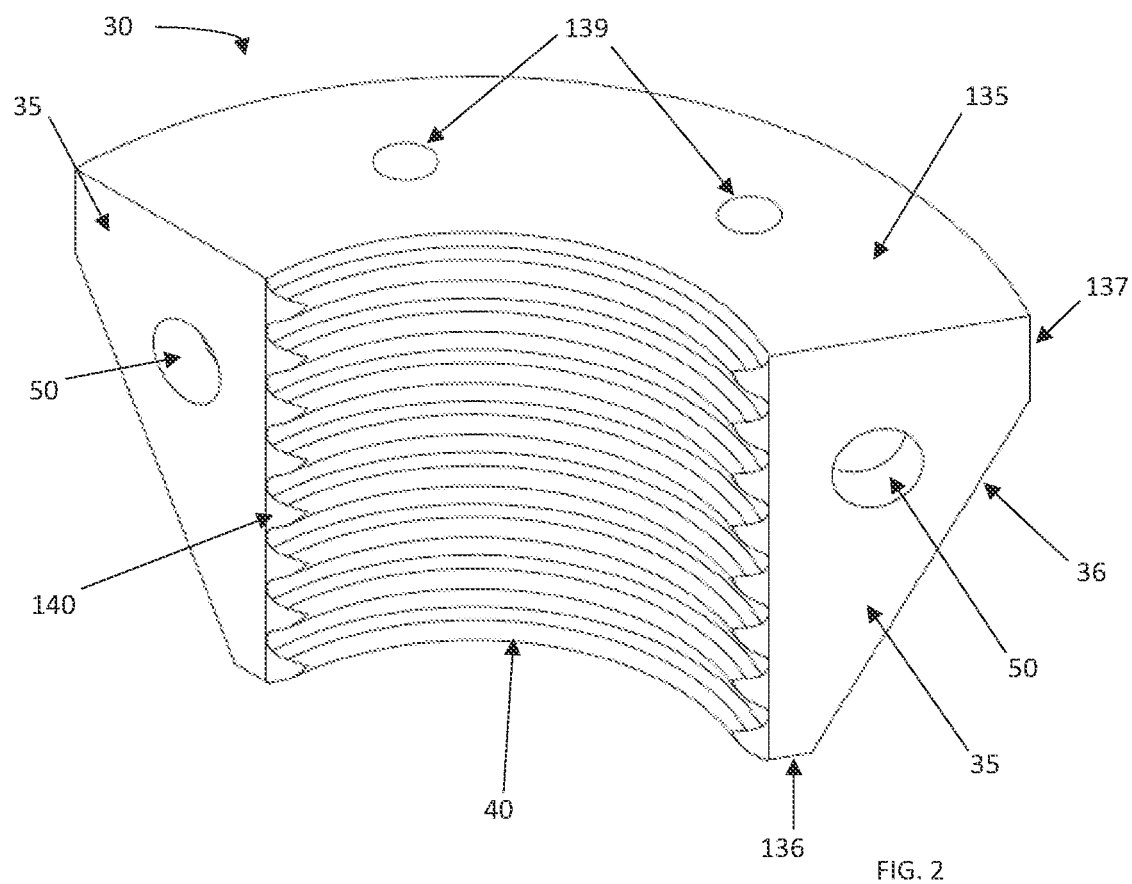
FIG. 2 depicts an orthogonal view of a single split nut segment.

As depicted in FIG. 1, the invention 100 uses a plurality of split nut segments 30 to engage a seat puller stem 20. As depicted in FIG. 2, each split nut segment 30 is generally in the form of an arcuate solid made by cutting a solid circular ring into multiple equal pieces. In this sense, the set of split nut segments 30 are comparable to a split nut known in the industry, such as one sold by AllFasteners. https://www.all-fasteners.com/tower-products/tower-nuts/split-nut. The description of cutting the split nut segments 30 is not a limitation. These parts could equally be cast or otherwise formed from raw materials.

Still referring to FIG. 2, split nut segment 30 comprises an arcuate center face 40 further comprising a set of horizontal v-grooves 140. Split nut segment 30 is further comprised of two sides 35 set at an angle to each other to permit the full set of split nut segments 30 used in the invention 100 together to form a ring when assembled. Split nut segment 30 further comprises a ramp side 36, a bottom 136, a top 135 and a back 137.

Figure 4:
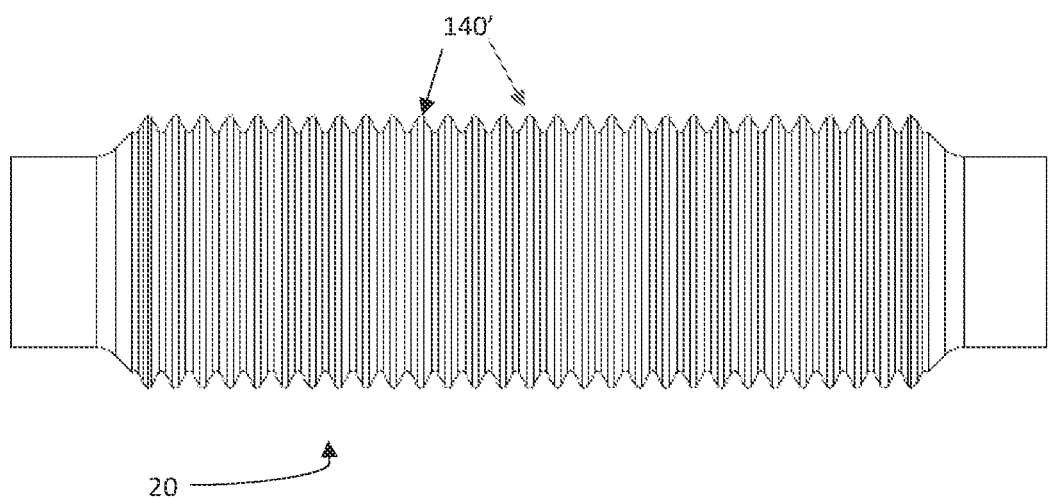
FIG. 4 depicts a side view of the v-grooves of the seat puller stem.

The horizontal v-grooves 140 disposed on the arcuate center face 40 may be made by casting or other known manner of forming a metal surface, but preferentially are made by milling. The horizontal v-grooves 140 are sized to engage horizontal v-grooves 140' of identical size and shape disposed on the seat puller stem 20, as depicted in FIG. 4. The size and shape of v-grooves 140 and 140' are determined, in part, by the forces applied to the invention 100 in pulling a valve seat 205 from a fluid end 220, depicted in FIG. 1. V-grooves 140 and 140' may be larger or smaller in different embodiments, and the shape of each may be flatter or rounder depending on various factors, which include the amount of force necessary to extract a valve seat 205 and the coefficient of friction of the metal used to make the split nut segment 30 and seat puller stem 20. In the preferred embodiment, horizontal v-grooves 140 and 140' are not threaded, such as on the thread of a screw, nut or bolt. Instead, the horizontal v-grooves 140 and 140' are horizontal, parallel grooves cut into the seat puller stem 20 and the center face of each split nut segment 30. However, in some embodiments, cutting a thread on the seat puller stem 20 and mating that thread to threading cut into the arcuate center face 40 of each split nut segment 30 is suitable.

Figure 5:
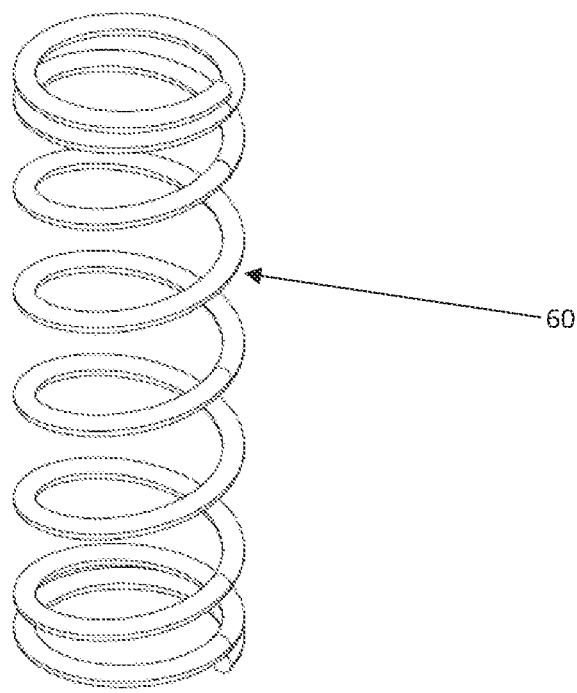
FIG. 5 depicts a side view of one helical spring used to separate spring nut segments.
Figure 13:
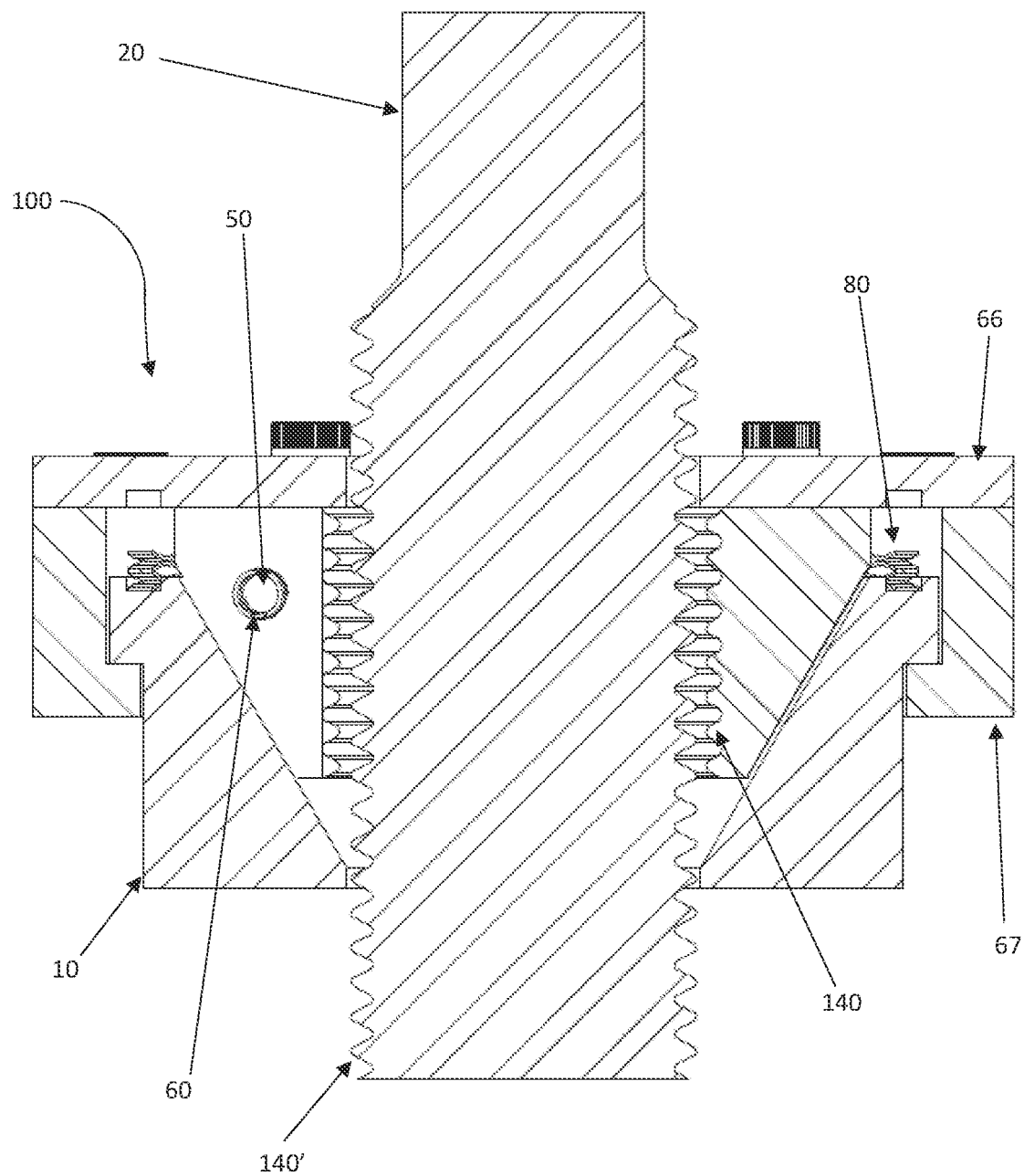
FIG. 13 depicts a cutaway side view of the invention further depicting the v-grooves of the seat puller stem in position to be engaged by the v-grooves of the split nut segments.

Referring to FIG. 2, each of the sides 35 of a split nut segment 30 has disposed therein a hole 50 suitable to permit the placement of one end of a helical spring 60, depicted in FIG. 5, therein. Placement of a helical spring 60 in hole 50 is depicted in FIG. 13. When three split nut segments 30 are used in the invention 100 to form a functional ring to retain the seat puller stem 20, three helical springs 60 are positioned in the total of six holes 50. Helical springs 60 used in this way provide potential energy in the invention 100 sufficient to separate each split nut segment 30 from each other split nut segment 30 and thereby to retract the split nut segments 30 away from seat puller stem 20 after the valve seat 205 has been pulled from the fluid end or when the invention 100 is not in use. In other embodiments of the invention 100, more holes 50 and helical springs 60 may be disposed in the sides 35 of the split nut segments 30 to provide spring energy to separate the split nut segments 30.

On the top 135 of each split nut segment 30 are disposed at least two alignment holes 139 suitable to allow the placement of alignment pins 239 depicted in FIG. 3 used to control the direction of motion of each of the split nut segments 30 during operation of the invention. The alignment holes 139 may be threaded or smooth to permit the placement of the alignment pins 239. The alignment pins 239 ensure each split nut segment 30 moves only radially toward or away from the horizontal axis 1000 of the invention 100.

Figure 6:
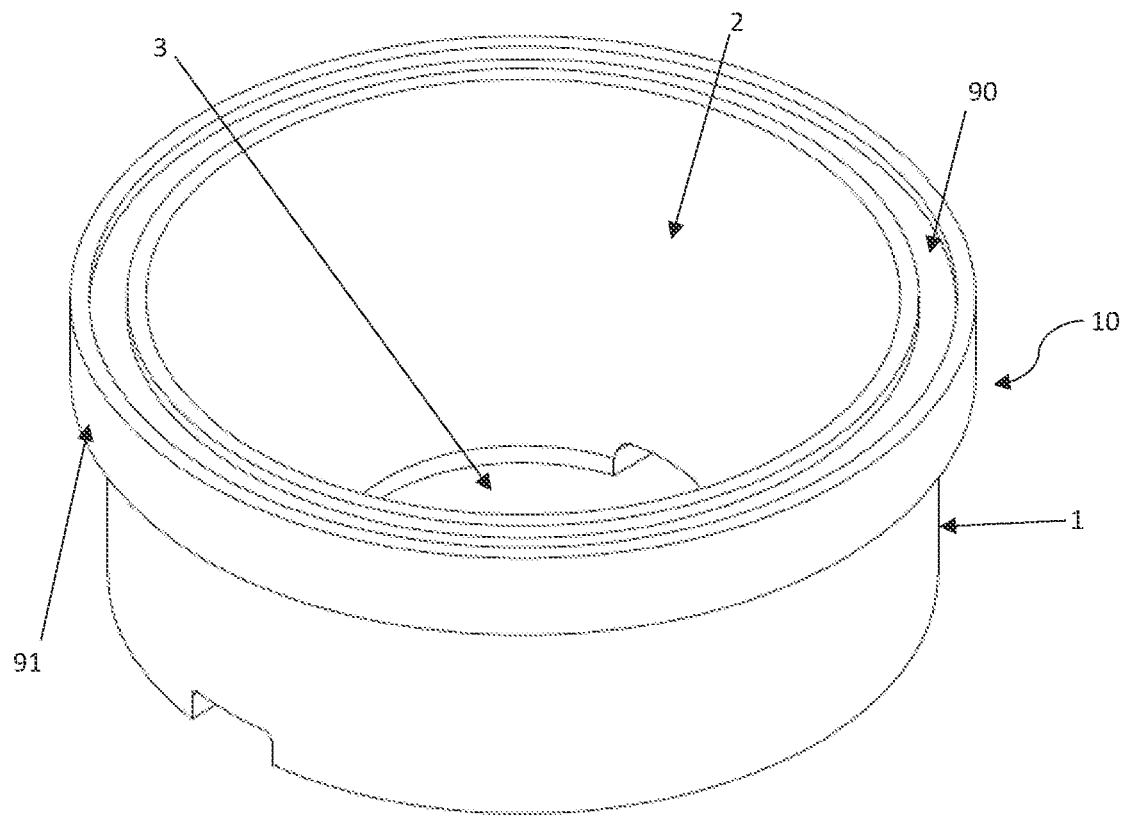
FIG. 6 depicts an orthogonal view of the base of the invention.
Figure 7:
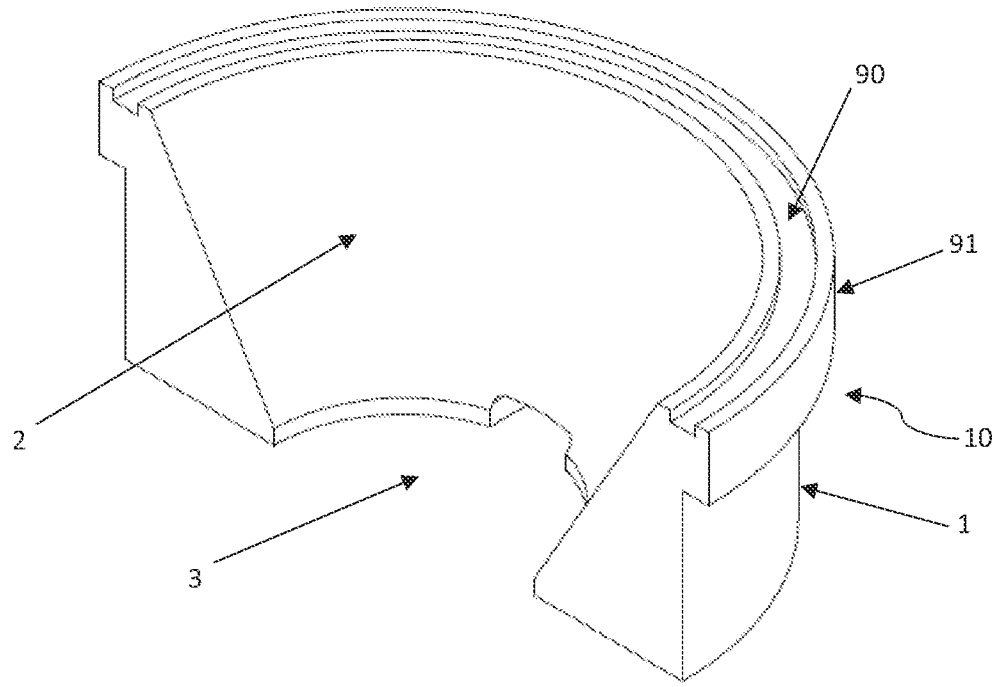
FIG. 7 depicts a cutaway view of the base of the invention. The cutaway view is used to highlight the conical interior surface of the base.

Referring now to FIG. 6, the invention 100 further comprises a base 10, with some features also depicted in FIG. 7. Base 10 is generally cylindrical in shape with further elements that include an outer vertical wall 1. Base 10 also comprises a ramped inner surface 2, which generally defines a truncated cone and which may also be referred to as the inner conical surface. An opening 3 is provided at the bottom of base 10. Opening 3 is large enough for the largest part of the seat puller stem 20 to pass through it during operation. Base 10 further comprises a lip 91 on which is disposed a flat bottom groove 90. Referring to FIG. 2 and FIG. 3, the angle Θ of the ramped inner surface 2 matches the angle Θ of the ramp side 36 of each split nut segment 30 such that when the split nut segments are placed in a ring on the ramped inner surface 2 of base 10, the arcuate center face 40 of each split nut segment 30 is parallel or approximately parallel to the longitudinal axis 1000 of the invention 100 and the v-grooves 140 disposed thereon are horizontal or nearly horizontal when the base 10 is oriented for use.

References in the previous paragraph to "parallel or approximately parallel" and "horizontal or nearly horizontal" are not intended to be indefinite but instead describe that a measure of leeway is built into the invention 100 to permit design and construction tolerances of parts of the invention 100 so that the invention 100 is operable within acceptable, functional tolerances by workers in an oil field.

Figure 8:
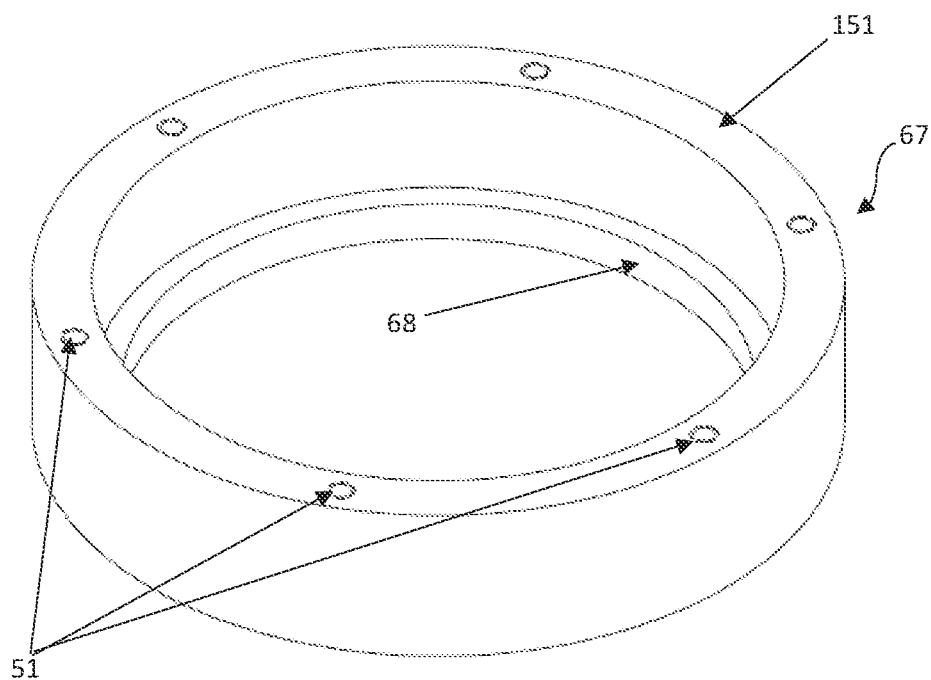
FIG. 8 depicts an orthogonal view of one part of the top of the invention.
Figure 9:
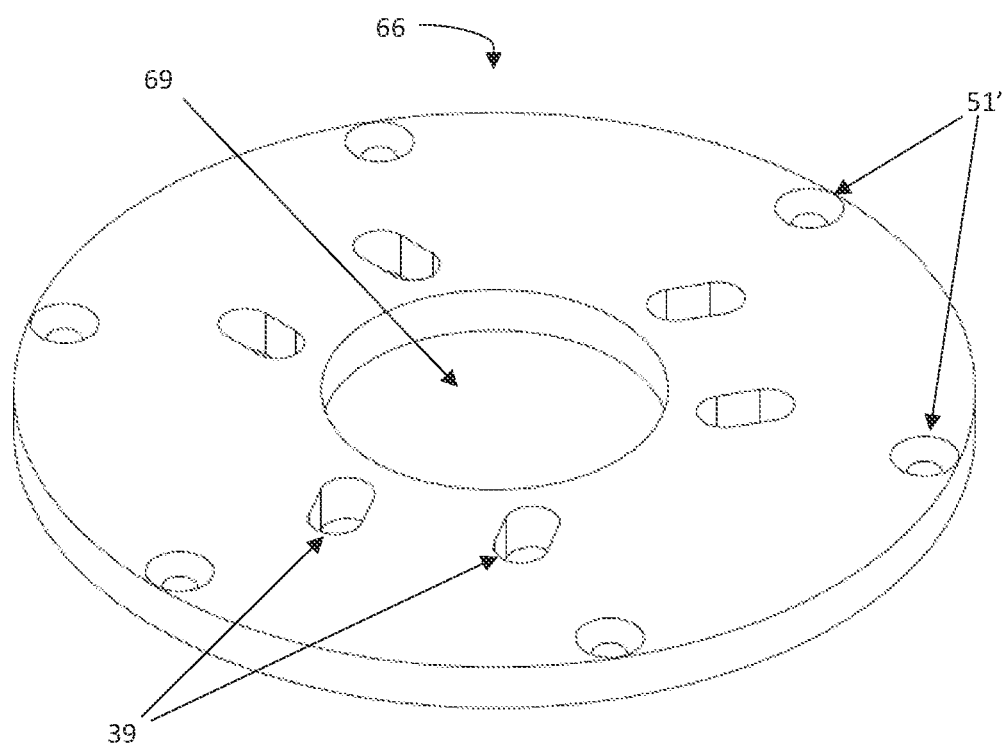
FIG. 9 depicts an orthogonal view of another part of the top of the invention.
Figure 10:
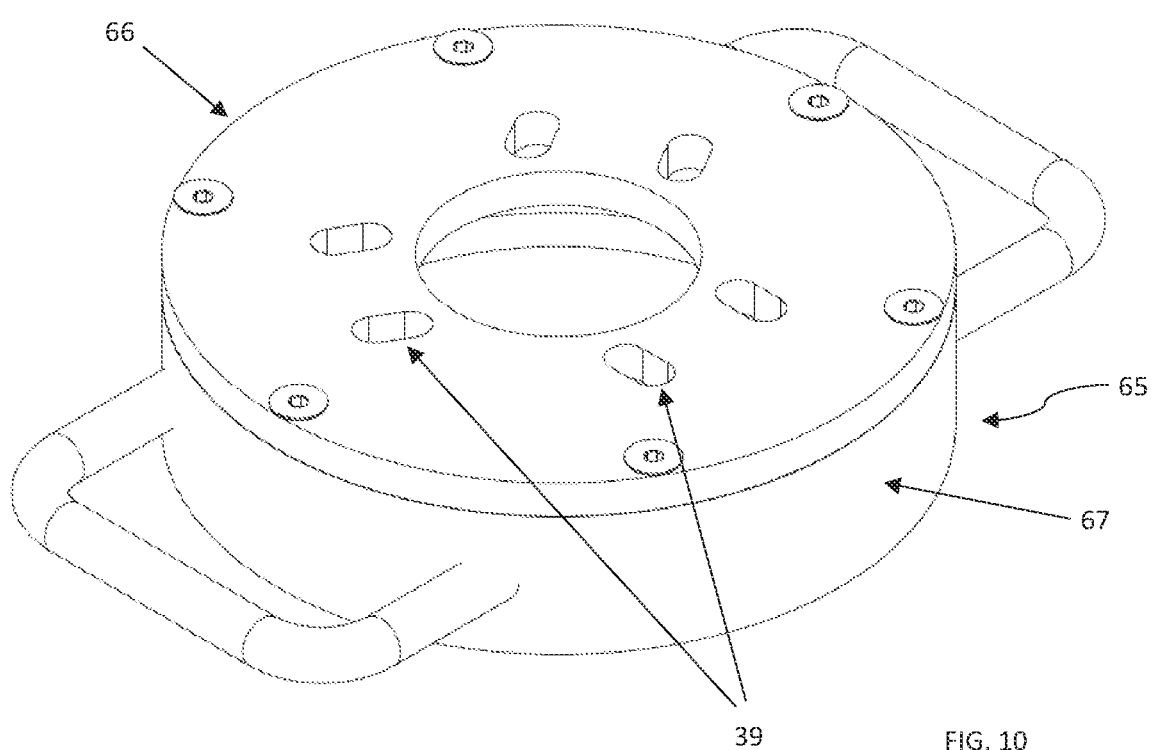
FIG. 10 depicts an orthogonal view of the parts depicted in FIG. 8 and FIG. 9 assembled.

Referring now to FIG. 10, the invention 100 further comprises a top piece 65, which preferentially is comprised of multiple parts. In a preferred embodiment, the top piece 65 is comprised of a side cylinder 67, depicted in FIG. 8 by itself and in FIG. 10, removeably attached to a top plate 66 depicted in each of FIG. 9 and FIG. 10. Side cylinder 67, as shown in FIG. 8, is a generally hollow cylinder with a height and inner diameter sufficient to permit assembly with base 10 and split nut segments 30 as depicted in FIG. 3 and FIG. 13. As depicted in FIG. 8, the top surface 151 of the side cylinder 67 has disposed therein a plurality of threaded holes 51 suitable to permit the top plate 66 (depicted in FIG. 9) to be removeably attached to the side cylinder 67. Side cylinder 67 further comprises a lip 68. As depicted in FIG. 3, the lip 68 of side cylinder 67 is sized to permit the lip 68 to engage against lip 91 of base 10 when those parts are assembled. These elements ensure the invention stays assembled. Top plate 66, as depicted in FIG. 3 and FIG. 9, is described as a plate of the same diameter as side cylinder 67. Top plate 66 further comprises a plurality of drilled holes 51' disposed therein along the top circumference of top plate 66 to permit mating of top plate 66 with the threaded holes 51 of side cylinder 67.

Referring to FIG. 3, FIG. 9 and FIG. 10, top plate 66 further comprises a plurality of alignment slots 39, which are elongated holes cut into the top plate 66 to permit alignment pins 239 to be placed into alignment holes 139 of each of the split nut segments 30 to maintain alignment of each of the split nut segments 30 during use. Each split nut segment 30, in the preferred embodiment, uses two alignment pins 239, requiring two alignment slots 39 for each split nut segment 30 in the top plate 66. As depicted in FIG. 9, three sets of two each alignment slots 39 are disposed in top plate 66 for use with three split nut segments 30. The top plate 66 also includes a center hole 69 which has the same or approximately the same diameter as hole 3 in base 10, as shown in FIG. 6. Hole 69 and hole 3 are sized to permit seat puller stem 20 to pass through the invention 100 during use.

Figure 11:
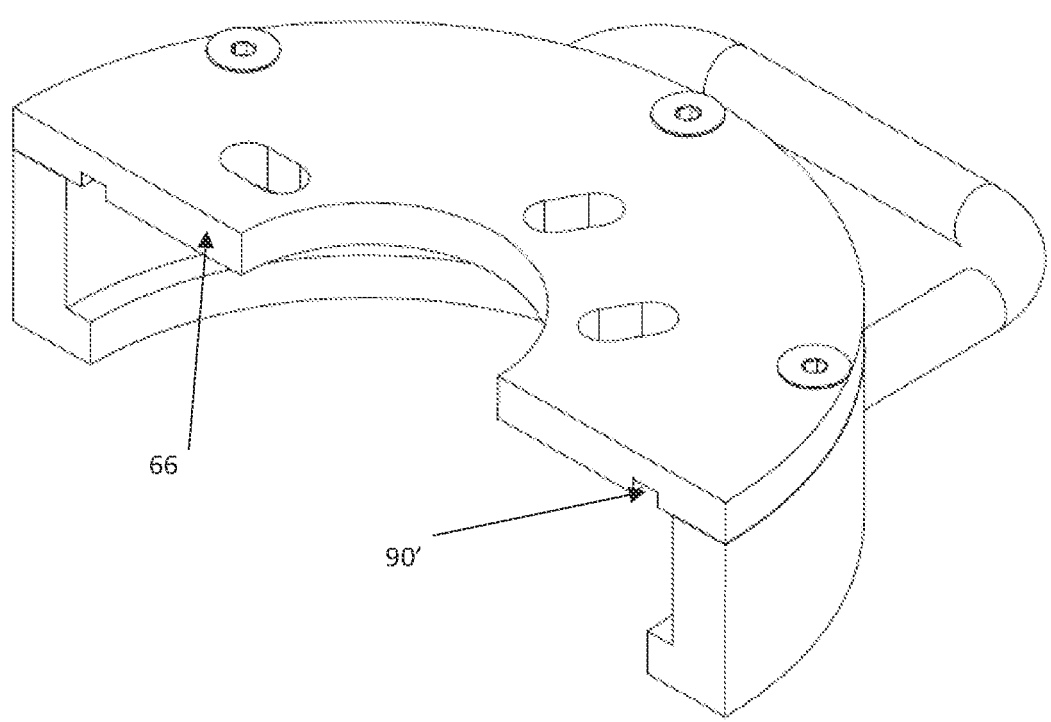
FIG. 11 depicts a cutaway view of the assembled parts depicted in FIG. 8 and FIG. 9 showing part of the circular slot in which the wave spring of FIG. 12 is placed.
Figure 12:
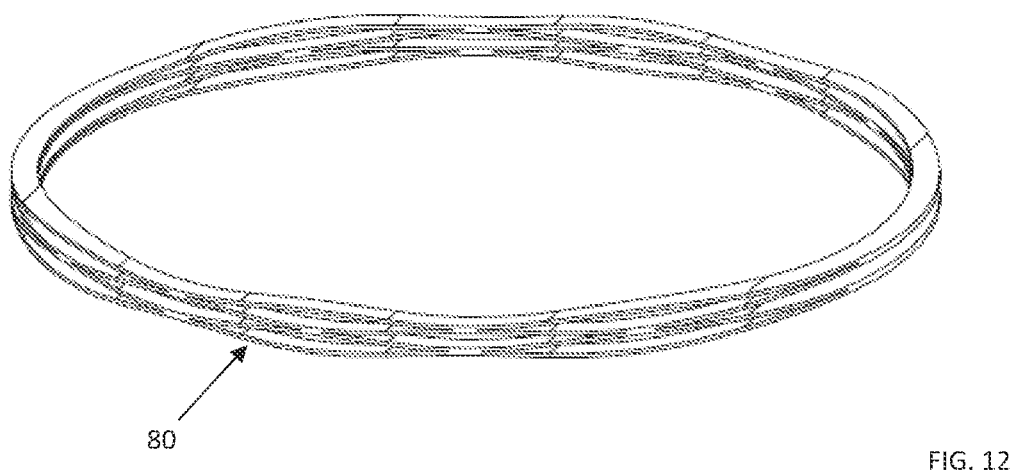
FIG. 12 depicts an orthogonal view of the wave spring.

FIG. 12 depicts a wave spring 80 which is disposed between the flat bottom groove 90 of the base 10 (depicted in FIG. 6) and a mated circular slot 90' on the underside of top plate 66 (depicted in FIG. 11). FIG. 3 depicts the position of wave spring 80 in grooves 90 and 90'.

Assembly of the Invention

The assembly description provided below is for the preferred embodiment of the invention 100. Alternate assembly steps may be necessary for alternate embodiments of the invention 100.

To assemble the invention 100, base 10 is placed within side cylinder 67 as shown in FIG. 3 so that lip 91 of base 10 and lip 68 of side cylinder 67 prevent base 10 from passing though the side cylinder 67. Next, and referring to FIG. 2 and FIG. 5, a plurality of split nut segments 30, each separated from the one next to it by a helical spring 60 inserted into holes 50 on sides 35 between adjacent split nut segments 30, are placed in a ring on the ramped inner surface 2 as depicted in the cut away depiction of FIG. 3. Depending on the method of attachment desired for the alignment pins 239, alignment pins 239 may be threaded or inserted into alignment holes 139 of each of the split nut segments 30. If this is done at this time, bolt heads are not at this time placed on the guide bolts 239. Wave spring 80 is placed in flat bottom groove 90. The top plate 66 is placed atop the side cylinder 67, split nut segments 30 and, if in place, alignment pins 239 by aligning the assembly to insert alignment pins 239 through the alignment slots 39 while concurrently aligning holes 51' (depicted in FIG. 9) of top plate 66 with threaded holes 51 of side cylinder 67 (depicted in FIG. 8). Once aligned, top plate 66 is then bolted using bolts 93 to side cylinder 67. Referring to FIG. 1, handles 600 are fixedly or removeably attached to side cylinder 67.

In an alternative embodiment, the base 10, side cylinder 67, split nut segments 30, wave spring 80 and helical springs 60 are assembled as described above. The top plate 66 is placed atop the assembled pieces such that the alignment slots 39 are positioned over the alignment holes 139. Alignment pins 239 are then inserted through the alignment slots 39 and into the alignment holes 139.

Referring to FIG. 3, FIG. 10 and FIG. 13, wave spring 80 raises the top plate 66 off the base 10 when the invention 100 is not in use. Simultaneously, helical springs 60 in holes 50 between each split nut segment 30 push the split nut segments 30 up the ramped inner surface 2 of base 10. As a result, as depicted in FIG. 3, the v-grooves 140 of the split nut segments 30 do not contact the v-grooves 140' of the seat puller stem 20 until the worker presses down on top plate 66. That act simultaneously compresses wave spring 80 and helical springs 60 and pushes split nut segments 30 down the ramped inner surface 2 of base 10.

FIG. 3 depicts top plate 66 sitting directly atop the split nut segments 30. This is not necessary but equally is not prohibited. Wave spring 80 must, however, have a sufficient spring constant to assure top piece 65 is raised high enough, when the invention 100 is not in use, to permit the split nut segments 30 to be separated by helical springs 60 and, at the same time, rise up the ramped inner surface 2 of the base 10, thus permitting the v-grooves 140 of the split nut segments 30 not to be in contact with the v-grooves 140' of the seat puller stem 20 until engaged by a worker pushing down on top plate 66. The design and construction of the invention 100 must permit the v-grooves 140 of the split nut segment 30 to engage the v-grooves 140' of the seat puller stem 20 when the top piece 65 is compressed against the wave spring 80, but then for the v-grooves 140 of the split nut segments 30 to be completely disengaged from the v-grooves 140' of the seat puller stem 20 when the wave spring 80 raises the top piece 65 off the base 10. These requirements determine, at least in part, the height of side cylinder 67 and the maximum space between lip 68 of side cylinder 67 and lip 91 of base 10.

Operation of the Invention

The description of the operation of the invention 100 is simplified from field operations. It describes those steps relevant to the operation of the invention 100 only.

The operation of the invention 100 is simple. Valve seats 205 are routinely replaced in a fluid end 220 after a certain number of hours of operation. When it is time to replace a valve seat 205, fracking fluid or any other fluid in the fluid end 220 is drained from the fluid end 220 and the discharge valve cover (not depicted) of the fluid end 220 is removed. This exposes the valve seat 205 for removal through the top of the fluid end 220. A pancake jack 500 or a similar lifting device known in the industry is placed on the fluid end 220 and positioned directly above the valve seat 205. Next, a worker inserts a seat puller stem 20 by hand, as shown in FIG. 1, by placing the duckbill (not numbered) in position proximate to the valve seat 205 and the v-grooves 140' of the seat puller stem 20 in position relative to the v-grooves 140 of the invention 100.

Invention 100 is placed atop the pancake jack 500. Invention 100 is lifted into place using handles 600. FIG. 1 depicts the placement of invention 100 atop the pancake jack 500 atop a fluid end 220. The worker lifts the seat puller stem 20 until the duckbill contacts the valve seat 205. In this position, the v-grooves 140' of the seat puller stem 20 are positioned next to the v-grooves 140 of the split nut segments 30 of the invention 100.

The worker then pushes downwardly on either the top piece 65 or handles 600. In so doing, top plate 66 compresses the wave spring 80. Pressing down on the top piece 65 equally pushes down on each of the split nut segments 30 causing each to be pushed down the ramped inner surface 2 of base 10. See also FIG. 3. This, in turn, pushes each of the split nut segments 30 toward the longitudinal axis 1000 of the invention such that the v-grooves 140 of the split nut segments 30 contact the v-grooves 140' of the seat puller stem 20. At the same time, pushing down on the top piece 65 compresses the helical springs 60 between the split nut segments 30. As previously described, when the worker releases the top piece 65 (or handles 600), friction and gravity cause the v-grooves 140 and '140' to remain in contact for further operation of the invention despite the compression of the springs. The worker then uses the pancake jack 500 or similar lifting device to raise the invention 100, the seat puller stem 20, duckbill and valve seat 205. When sufficiently raised, the valve seat 205 is removed from the fluid end, at which time the worker turns off the pancake jack 500 or similar lifting device.

Next, the worker lifts the seat puller stem 20 slightly. This releases the v-grooves 140 of the split nut segments 30 from the v-grooves 140' of the seat puller stem 20. When released, the energy stored in the helical springs 60 separates the split nut segments 30 and equally pushes each of the split nut segments 30 up the ramped inner surface 2 of base 10. Likewise, the potential energy stored in wave spring 80 lifts the top piece 65 off the base 10.

The invention 100 is not limited to the description above but may be practiced within a range of variations described herein. For a specific example, although the invention 100 is described as using three split nut segments 30, the invention 100 may be practiced using two or more split nut segments 30. Similarly, although v-grooves 140 and 140' or the similar helical threads are described as suitable designs for holding a seat puller stem 20 in place between split nut segments 30, any form of mated protrusions, including forms with radial symmetry, may be practiced in the invention 100 successfully. In other embodiments, instead of a single wave spring 80, multiple helical springs may be disposed between the base 10 and top piece 65 to provide space within the invention 100 to permit the split nut segments 30 to slide up the ramped inner surface 2.

We claim:

1. An apparatus configured to be manually operated for engaging a valve seat stem used to pull a valve seat from oil field equipment, comprising:

a base having a cylindrical shape with an outer circumference,
   a top and a bottom,
   a ramped inner surface ending in an opening at the bottom of the base,
   an outer vertical wall, a lip having a top surface disposed along the entire top outer circumference of the outer vertical wall of the base
   and a flat-bottom groove disposed in the top surface of the lip;

a two-piece top piece operably joinable to the base comprising
   a hollow cylinder having an inner diameter, inner circumference and height sized to engage the base functionally and
   a lip disposed along the entire inner circumference of the hollow cylinder to engage the lip of the base to allow the top piece and base to function as a unit
   and further comprising a top plate having an opening on the axial center of the top plate, wherein the top plate is removeably fixable to the hollow cylinder and in which the top plate further has disposed therein a plurality of alignment slots;

a plurality of split nut segments, each of which comprises an arcuate center face having disposed thereon a set of horizontal v-grooves
   and a ramp side configured to operate functionally on the ramped inner surface of the base and further in which the plurality of split nut segments combine to form a ring when disposed slidably on the ramped inner surface of the base;
   wherein each split nut segment is slidably attached to one or more alignment slots of the top plate of the top piece;

a wave spring set in the flat-bottom groove of the lip of the base such that the wave spring raises the top piece off the base when no manual pressure is applied to the top piece;

and at least one helical spring disposed between each pair of adjacent split nut segments of the plurality of split nut segments; and wherein the apparatus is configured to be operated by the manual compression of the top piece against the base, causing each of the split nut segments to move radially toward the axial center of the apparatus to engage a valve seat stem.

\* \* \* \* \*